Nov. 21, 1950        A. W. HERRINGTON        2,531,269
POWER UNIT ARRANGEMENT FOR DELIVERY TRUCKS
Filed June 5, 1948        2 Sheets-Sheet 1
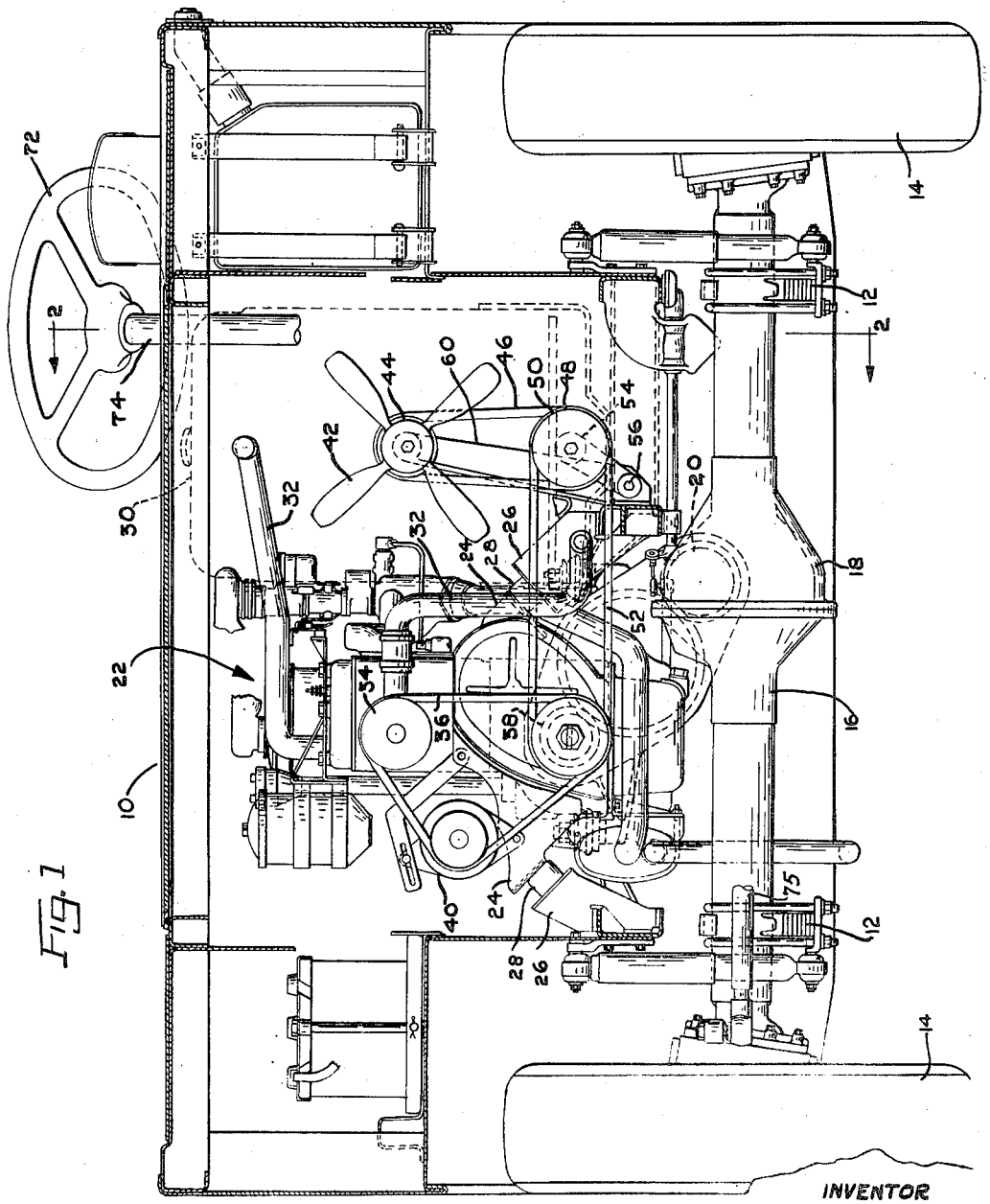
INVENTOR
ARTHUR W. HERRINGTON
BY
*Toulmin & Toulmin*
ATTORNEYS

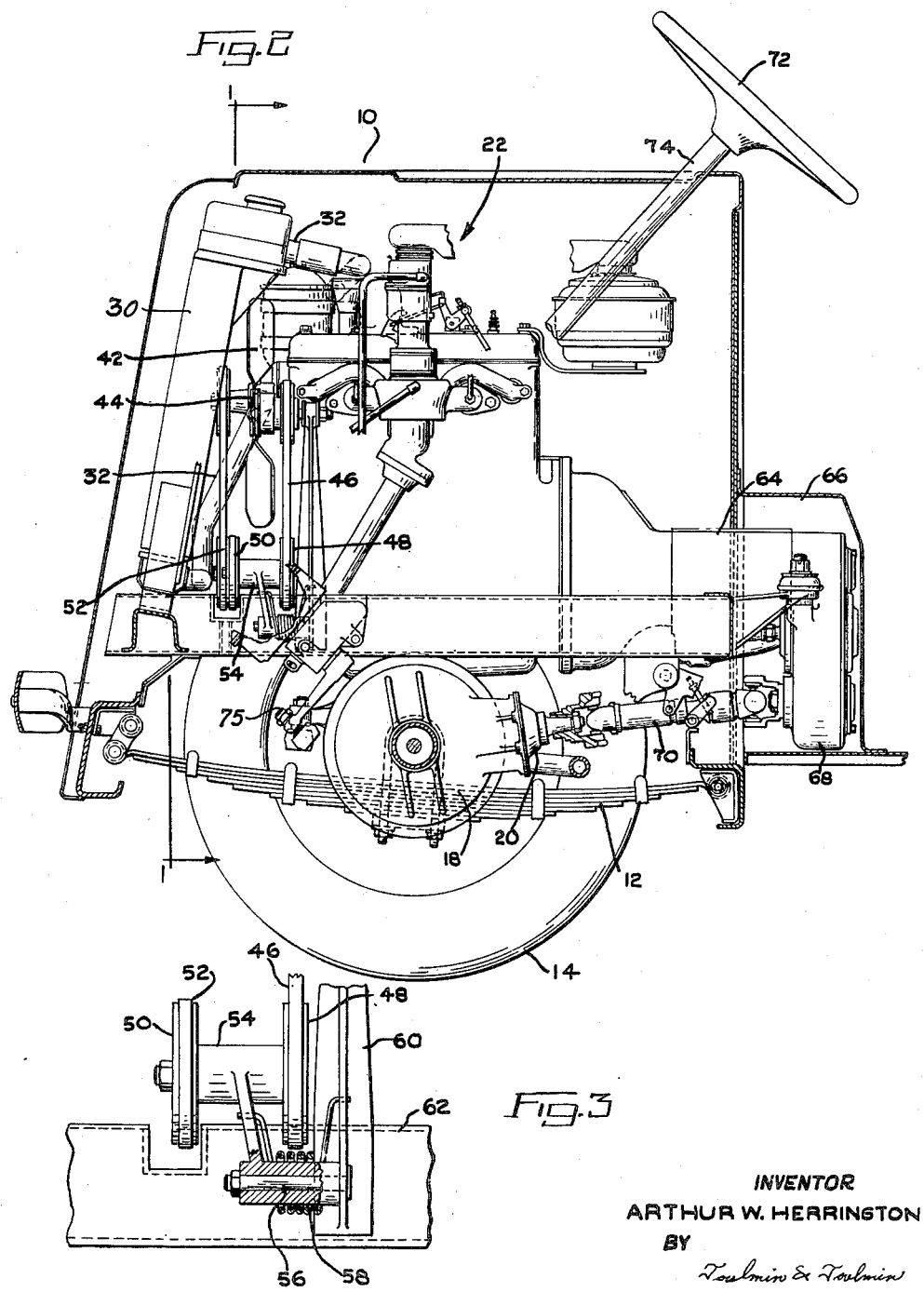

Patented Nov. 21, 1950

2,531,269

UNITED STATES PATENT OFFICE 2,531,269

POWER UNIT ARRANGEMENT FOR DELIVERY TRUCKS

Arthur W. Herrington, Indianapolis, Ind., assignor to Marmon-Herrington Company, Inc., Indianapolis, Ind., a corporation of Indiana Application June 5, 1948, Serial No. 31,315

6 Claims. (Cl. 180—12)

This invention relates to automotive vehicles, and particularly to such vehicles when characterized by a power unit in the front end thereof.

More particularly still, this invention relates to automotive vehicles having front mounted power units in which the said power unit is made very compact in order to leave available the maximum amount of floor space in the vehicle between the wheels for load carrying functions.

It has been found in connection with vehicles of the type referred to above that in order to make the power unit end of the vehicle compact, the engine may be mounted tranversely in the compartment and a drive taken from the engine to the adjacent road wheels.

This arrangement, while satisfactory for providing the needed load carrying space in the vehicle, is found to be at fault because the cooling air which is drawn through the radiatior for the engine flows directly against the side of the engine and either detracts materially from the efficiency of operation thereof, or in some cases, even causes condensation of moisture within the engine, which has a tendency to dilute the oil and to cause corrosion of some of the finely finished parts of the engine.

Thus, while the transversely mounted engine solves the problem of providing for a maximum of load carrying space, it, at the same time, presents serious problems of its own.

The primary object of the present invention is to provide an arrangement for a vehicle having a power unit in the front driving into the adjacent ground wheels which will overcome the foregoing objections.

A still further object is the provision of an arrangement for the engine and the radiator in a vehicle having the engine mounted at the front thereof such that the cooling air drawn through the radiator does not detract from the efficient operation of the engine or cause other harmful results thereto.

It is also an object of this invention to provide an engine arrangement for a front wheel drive vehicle in which the drive for the engine to the front wheels is simpler than is possible with the usual transversely mounted engine.

These and other objects and advantages will become more apparent upon reference to the following description taken in connection with the accompanying drawings in which:

Figure 1 is a transverse section indicated by the line 1—1 on Figure 2;

Figure 2 is a longitudinal section generally indicated by the line 2—2 on Figure 1; and Figure 3 is a small detail view showing an idler pulley arrangement forming a part of the driving connection between the engine and the cooling fan for the radiator.

Referring to the drawings more in detail, the arrangement according to this invention comprises an engine compartment 10 which, as will be seen from the drawings, comprises the forward portion of a vehicle body which may be of the stand-up drive type ordinarily used in distribution of consumer goods such as dairy and bakery products.

The engine compartment 10 is resiliently mounted by means of the springs 12 to a ground wheel unit comprising the steerable ground wheels 14 and the interconnecting axle structure 16 which has intermediate its ends a differential 18 having power input means 20 extending rearwardly therefrom.

Referring to Figure 1, it will be noted that within the engine compartment 10 there is an engine 22 which is of substantially conventional type and which is mounted to one side of the vertical center line of the engine compartment.

The particular nature of the engine is of no particular importance except that it is an internal combustion engine and includes mounting feet as at 24 which engage the mounting brackets 26 as by means of the resilient pads 28. The mounting brackets 26 are integral with the structural frame work of the engine compartment and provide the supporting means for retaining the engine in position.

As mentioned before, the engine is of the internal combustion type and thus requires that cooling fluid be passed therethrough in the usual manner. For accomplishing this, there is a radiator 30 which may be of conventional type and which is mounted on the opposite side of the center line of the engine compartment from the engine 22.

The radiator is connected with the fluid passages of the engine by means of the hoses 32 so that fluid which is cooled in the radiator can then be circulated in the engine. For so circulating the fluid there is provided the usual water pump which may be driven by the pulley 34 that is connected by the belt 36 with a power take-off pulley 38 mounted on the end of the engine drive shaft. The belt 36 may be employed, as shown, for driving the generator 40 if so desired.

For causing air to pass through the radiator 30 a fan 42 is mounted directly behind the radiator and secured to the fan is a pulley 44 over which passes a driving belt 46. The driving belt 46 passes over an idler pulley 48 which is mounted on the same shaft with a second idler pulley 50 over which passes a belt 52 that extends to and over a second power take-off pulley mounted on the engine drive shaft with the pulley 38.

The idler pulleys 48 and 50 are mounted on a bracket 54 which, as will best be seen in Figure 3, is pivotally supported by a stud 56 and resiliently urged by a spring 58 toward a position to maintain both of the belts 52 and 46 taut. As shown, the stud 56 engages the upright bracket 60 which forms the support for the fan 42 which, at its lower end, is rigidly secured to one of the structural frame members of the engine compartment as at 62.

It will be noted that due to the laterally displaced positions of the engine and fan, the cooling air which is drawn through the radiator is directed to one side of the engine and does not impinge thereon. There is thus no tendency for this blast of air to cause cold spots on the sides of the motor or on the manifold thereof which might lead to inefficient operation of the engine or to condensation of water therein which would tend to dilute the lubricating oil in the motor or to bring about corrosion or rust of finished parts thereof.

The rear end of the engine is extended as at 64 in a transmission arrangement which is enclosed in part by a housing 66 extending rearwardly from the compartment 10. This transmission 64 is connected by gearing within the housing 68 and a flexible drive shaft as at 70 with the input 20 of the differential 18. Motive power is thus transferred from the engine 22 to the ground wheels 14.

Reference to Figure 1 will reveal that the housing 66, covering in part the transmission mechanism connected between the engine 22 and the differential 18, is on one side of the center line of the engine compartment, while the steering mechanism, including the steering wheel 72 and the steering colum 74, is on the other side of the said center line. By this arrangement there is no interference between the steering mechanism and the engine parts, and the housing 66 for the transmission mechanism 68 does not interfere with the driver of the vehicle when it is necessary for the vehicle to be operated from a stand-up position.

The lower end of the steering column is connected with the steerable ground wheels 14 by linkage 75 extending transversely and forwardly of the axle 16.

It will be understood that any suitable and well known arrangement of control, such as clutch and brake levers, gear shifting levers, and engine control devices, such as throttle and choke, could be mounted adjacent the operator's position without in any way affecting the arrangement of the engine and radiator as described above.

It will also be apparent that by laterally displacing the radiator and the engine, the said engine can be mounted somewhat forwardly of the position it would occupy if placed behind the radiator and the transmission extended to somewhat beyond the rear wall of the engine compartment and without increasing the overall length of the entire power unit, including ground wheels and so forth. The resulting power unit is accordingly of the same dimensions as previous power units in which the engine was mounted transversely and is interchangeable therewith.

At the same time all the aforementioned deleterious effects of the cooling air from the radiator flowing over the engine, have been entirely eliminated. The drive mechanism between the engine and the drive axle is also somewhat simpler in that substantially conventional drive can be employed between the transmission and the differential 18 and without the necessity of jackshafts extending transversely of the engine compartment and special gearing arrangements for driving and connecting the jack-shaft to the necessary differential mechanism.

It will be understood that this invention is susceptible to modification in order to adapt it to different usages and conditions and, accordingly, it is desired to comprehend such modifications within this invention as may fall within the scope of the appended claims.

I claim:

1. In a vehicular power unit, steerable ground wheels and an axle therebetween, a compartment resiliently mounted on said axle and substantially equally disposed forwardly and rearwardly of said axle, an engine extending longitudinally along one side of said compartment and substantially centered over said axle, a flexible drive means connecting the rear of said engine with said wheels, a radiator for said engine and located at the front of the other side of said compartment forwardly of said axle, and a fan for said radiator located in said compartment behind the radiator and drivingly connected to said engine, and steering means for said ground wheels extending diagonally through said compartment behind said radiator and including a steering wheel at the rear of the compartment.

2. In a vehicular power unit, steerable ground wheels and a drive axle connecting the wheels, a compartment resiliently mounted on said axle, an engine extending longitudinally along one side of said compartment and positioned over said axle, a flexible drive means connected with the rear of said engine and drivingly connected with said axle, a radiator for said engine and located at the front of the other side of said compartment, a fan for said radiator located in said compartment behind the radiator and drivingly connected to said engine, and steering means for said ground wheels extending through said compartment behind said radiator to a steering wheel at the rear thereof.

3. In a vehicular power unit, steerable ground wheels, a compartment resiliently supported on said wheels, an engine extending along one side of said compartment, a flexible driving connection between the rear part of said engine and said wheels, a housing extending rearwardly from the bottom of the said one side of said compartment for enclosing a part of the said driving connection, a radiator for said engine at the front of the other side of said compartment, a fan behind said radiator for passing cooling air therethrough, and steering means for said wheels extending through the said other side of said compartment, said steering means including a steering wheel rearward of said compartment and linkage forward of said axle connecting said means with said ground wheels.

4. In a vehicular power unit; a frame, steerable ground wheels and an axle connecting said wheels, means resiliently supporting said frame on said axle, a differential unit in said axle between said wheels and having an input from the rear, an engine compartment mounted on said frame, an engine supported on said frame extending longitudinally along one side of said compartment, a flexible drive extending from the rear of said engine to said input for the differential, a radiator for said engine at the front of the other side of said compartment, a steering column extending diagonally through said compartment behind said radiator including a steering wheel rearward of said compartment, and means forward of said axle connecting said steering column with said wheels.

5. In a vehicular power unit; steerable ground wheels and an axle connecting said wheels, a differential unit in said axle between said wheels and having an input from the rear, a frame for said unit resiliently mounted on said axle, an engine compartment mounted on said frame, an engine extending longitudinally along one side of said compartment and supported by said frame, a flexible drive extending from the rear of said engine to said input for the differential, a radiator for said engine at the front of the other side of said compartment, a fan for drawing cooling air through said radiator and drivingly connected with said engine, and steering means for said wheels extending through said compartment behind said radiator, said unit being substantially balanced over said axle when in position for connection with a vehicle body.

6. In a power unit for a vehicle; steerable ground wheels, driven axle means connecting said wheels, a frame for the said unit centrally disposed over said axle and resiliently supported thereon, a compartment mounted on said frame, an engine supported on said frame within said compartment and extending along one side of said compartment and also centrally disposed over said axle, a flexible driving connection extending from the rear end of said engine to said axle, a housing member extending outwardly from the rear wall of said compartment for enclosing a part of said driving connection, said housing being at the said one side of said compartment, a radiator for said engine at the front end of the other side of said compartment, a fan behind said radiator drivingly connected with said engine and drawing cooling air through said radiator, steering means for said ground wheels extending through the other side of said compartment behind said radiator and including a steering wheel at the rear side of said compartment, and a floor for the cab of the vehicle of which said power unit forms a part connected to said unit and extending rearwardly from the rear wall of said compartment.

ARTHUR W. HERRINGTON.

REFERENCES CITED

The following references are of record in the file of this patent:

UNITED STATES PATENTS

| Number | Name | Date |
|---|---|---|
| 1,450,292 | Holmes | Apr. 3, 1923 |
| 1,557,486 | Valentine | Oct. 13, 1925 |
| 2,003,718 | McCarthy et al. | June 4, 1935 |
| 2,058,228 | Hierta | Oct. 20, 1936 |
| 2,092,040 | Aitken | Sept. 7, 1937 |
| 2,124,166 | Mallett | July 19, 1938 |
| 2,162,334 | Herrington | June 13, 1939 |
| 2,165,795 | Holmstrom | July 11, 1939 |